March 25, 1969     E. E. WILSON     3,434,172

CAR WASH BRUSHING APPARATUS

Filed Aug. 7, 1967

INVENTOR.
EARL E. WILSON
BY
AGENT

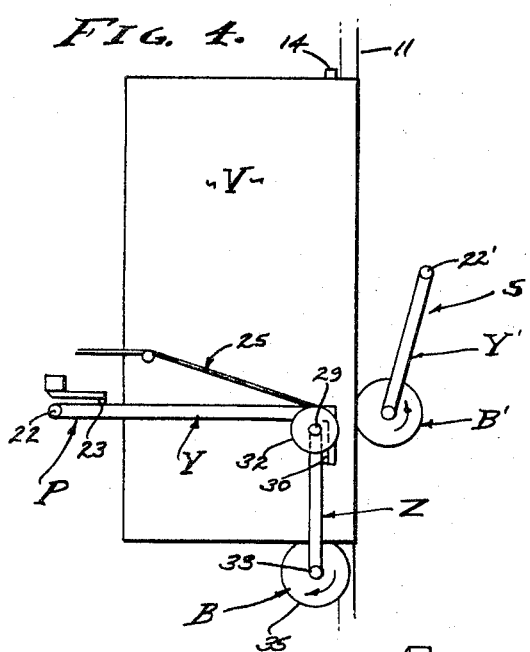
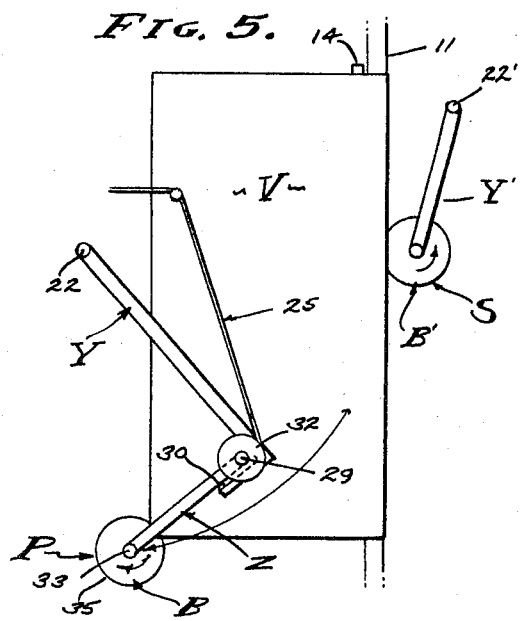
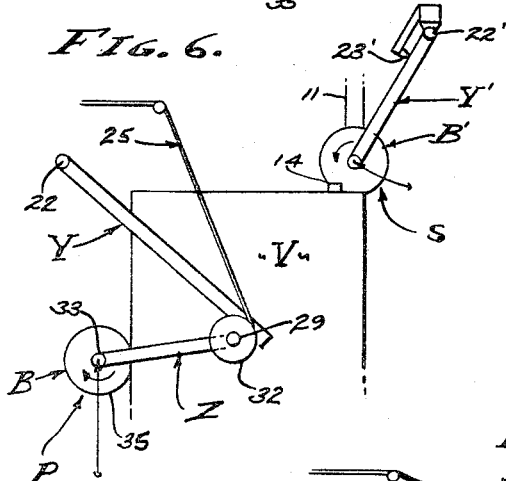
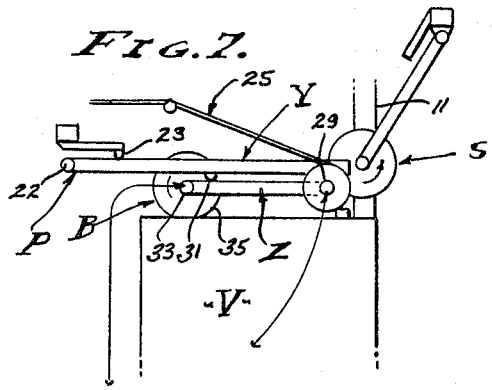
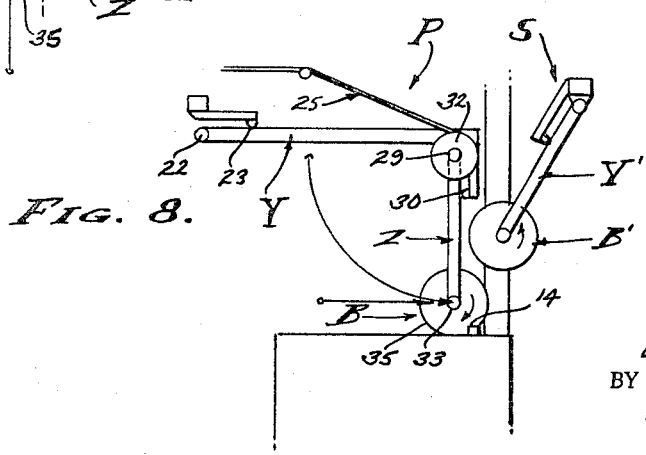
INVENTOR.
EARL E. WILSON
BY
AGENT

United States Patent Office 3,434,172
Patented Mar. 25, 1969

3,434,172
CAR WASH BRUSHING APPARATUS
Earl E. Wilson, 1328 Newport Ave.,
Long Beach, Calif. 90804
Filed Aug. 7, 1967, Ser. No. 658,679
Int. Cl. B60s 3/06; A47l 1/02
U.S. Cl. 15—21                                    4 Claims

ABSTRACT OF THE DISCLOSURE

This invention relates generally to automobile washing installations and more specifically to the functions therein of brushing the substantially vertically disposed planar surfaces of the vehicle body and particularly the front, sides, and back surfaces of the vehicle body, a characteristic feature of this invention being the provision of a single primary brush and a single secondary brush, the two of which are adapted to scrub entirely the four sides of the vehicle body.

---

Figure 1:
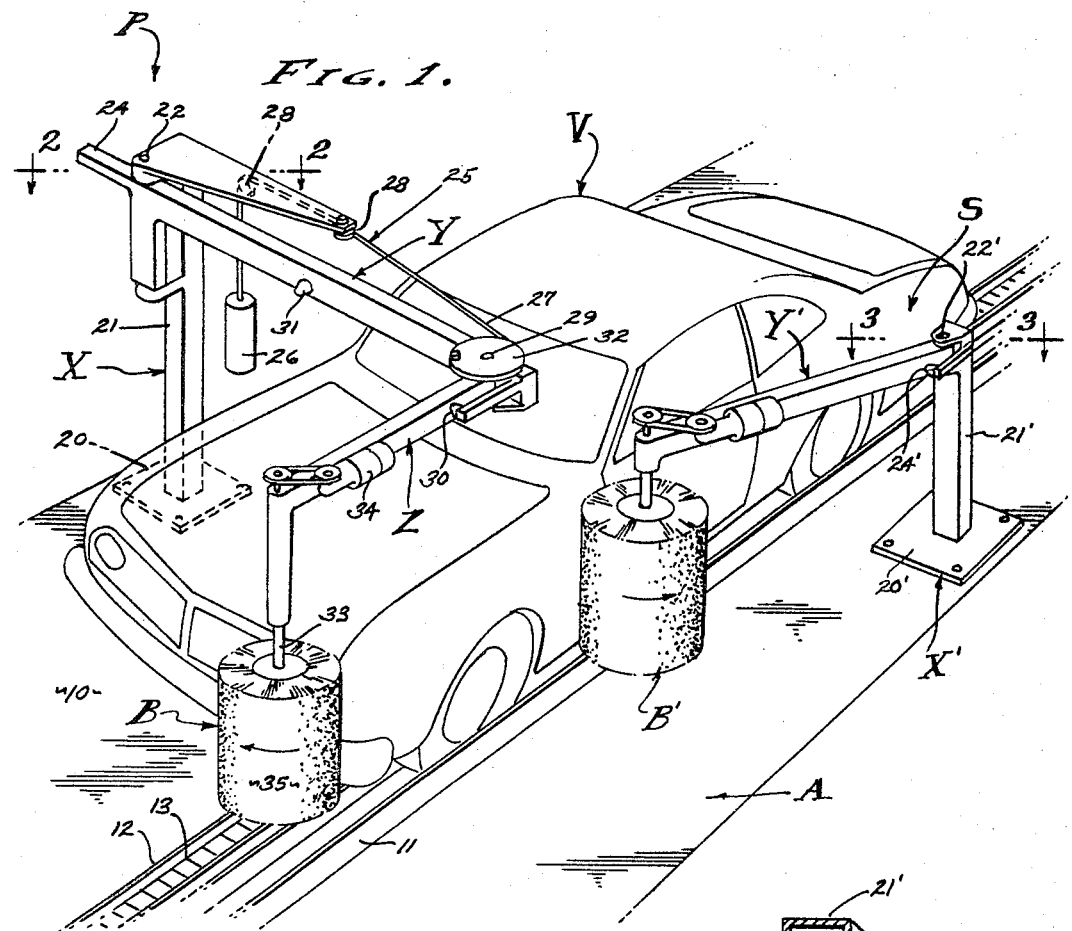

The washing of automobiles has been automated to various extents, as circumstances require, and although brushing units are available to wash the front, sides and back of the vehicle body, manual labor is most often resorted to, to some extent at least due to inefficiencies inherent in said prior art units. In order to accomplish automated brushing, the present state of this art provides at best two complementary brushing units, each of primary character and each disposed in sequential order to scrub opposite sides of the automobile. The two brushing units that I make reference to are similar to the single unit that I hereinafter disclose, but they involve arms that are so related to the vehicle being washed that it is impossible for one unit thereof to wash the vehicle. Consequently, the prior art resorts to two such opposite and complementary brushing units, each of which scrubs from the center of the automobile outwardly, longitudinally and then inwardly back to said center. Therefore, it is a general object of this invention to provide a single primary brushing unit which is capable of dispensing with the necessity of a like and opposite complementary unit, by virtue of its ability to scrub the entire front as well as the entire back of the vehicle body. In practice, the present invention eliminates the longitudinal extent of two units arranged sequentially, reducing the longitudinal extent to a single unit only.

Another problem with the washing of vehicles with automated apparatus is that deficiencies occur which must be corrected by resort to additional apparatus and/or manual labor. For example, the longitudinal traverse of the brushing function along the sides of the vehicle most often requires auxiliary brush units, simply adapted to supplement the functions of the primary units, the primary units being essential principally for scrubbing the front and back of the vehicle body. In this respect, therefore, it is an object of this invention to provide a single auxiliary or secondary brushing unit that cooperates with the single primary brushing unit to brush the one remaining side of the vehicle.

Still further, there is the problem of the automobile conveyor apparatus which most often involves a wheel guide and a pusher-bar that extends upwardly from the ground level to engage behind the rear bumper of the vehicle immediately inboard of the left rear wheel thereof. The typical pusher-bar is of sizeable configuration and interferes with the scrubbing progression of the revolving brushes that are employed to traverse the back of the vehicle body. Specifically, when a revolving brush encounters a pusher-bar, or any like obstruction, the core of the brush is likely to strike (directly or indirectly) the said bar, or obstruction, with consequent destruction of parts and upheaval and violent oscillation of the brush into and out of engagement with the vehicle body. For example, the common pusher-bar can be disengaged through striking of the same laterally as by the rotation of the brush engaged therewith. It is a further object, therefore, to provide a novel arrangement of brushing units comprising a primary brushing unit and a secondary brushing unit, and to the end that the entire sides of the vehicle are scrubbed up to said pusher-bar or like obstruction, all without the adverse striking of the brush core, or cores, therewith.

It is still another object of this invention to provide cooperatively related primary and secondary brushing units which are adapted to receive vehicles of all shapes and sizes, vehicles of varying width, to scrub the entire front, sides and back thereof.

The various objects and features of this invention will be fully understood from the following detailed description of the typical preferred form and application thereof, throughout which description reference is made to the accompanying drawings in which:

FIG. 1 is a perspective view illustrating a typical installation of the car wash brushing apparatus.

Figure 2:
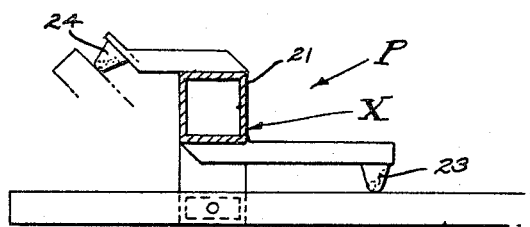
Figure 3:
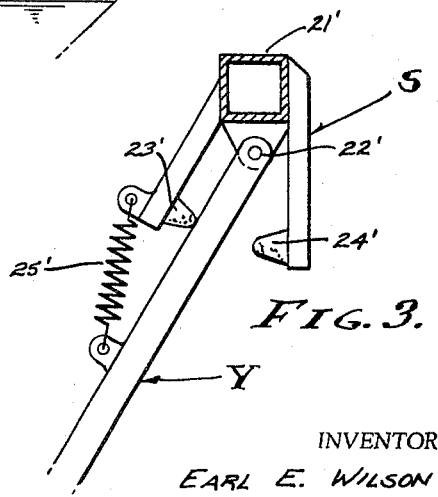

FIGS. 2 and 3 are enlarged detailed views taken substantially as indicated by lines 2—2 and 3—3 on FIG. 1.

FIGS. 4 through 8 are diagrammatic plan views showing the five principal conditions of the apparatus as they occur during operation thereof, FIG. 8 illustrating a preferred longitudinal placement of the primary and secondary brushing units.

The car wash brushing apparatus that I provide is adapted to scrub all four sides of automobiles throughout the extreme range of sizes and configurations that are available at the present time. The variations in size and contours are compensated for in the arrangement and relationship of the two brushing units that I provide, there being a primary brushing unit P and a secondary brushing unit S installed at opposite sides of an alley A through which the vehicle V is transported. It is significant that this invention provides the economy and space savings made possible by necessity of but one single primary brushing unit P, and in that the economical expenditure and space occupancy involved in the secondary brushing unit S is minimal.

Referring to FIG. 1 of the drawings, the vehicle V is shown as a typical present day automobile, a sedan, that is being transported through the alley A which comprises a driveway 10 with wheel guides 11 and a conveyor 12. The driveway 10 is a longitudinal road that is paved and adapted to support the vehicle for rolling engagement forwardly through the car wash with or without the aid of the conveyor. That is, the vehicle V can be driven through the car wash and simply guided by the wheel guides 11. The wheel guide 11 is an elongate unit that receives the vehicle at the entry to the alley A, the conveyor 12 transports the vehicle throughout the length of the alley, and the vehicle is thereby delivered at the terminal end of the alley. The conveyor 12 can vary widely as circumstances require and, for example, can be a moving chain with hooks to engage and pull the vehicle, or it can be an automatic conveyor with rollers within the confines of the wheel guides 11 to engage the vehicle wheels to roll forwardly, and is shown in a typical form as a pusher-bar conveyor having a channel disposed longitudinally of or in the driveway 10, at and/or just inboard of the left hand wheels of the vehicle V. The conveyor channel houses a conveyor chain 13 or the like, and the pusher-bar 14 projects upwardly from the driveway to engage behind the rear bumper of the vehicle, immediately inboard of the left rear wheel. It is to be understood that the car wash per se may include, when desired, the other required pieces of equipment such as, for example, soap and/or water sprays, hood, top and rear brushing units, and dryers (not shown).

The primary brushing unit P is, for best performance, installed at the side of the vehicle opposite the wheel guides and that where the pusher-bar 14 engages the same, while the secondary brush unit S is installed at the side opposite the said primary unit. Consequently, a normal installation involves a primary unit P at the right and a secondary unit S at the left of the alley A. As shown, the two brushing units P and S are positioned so as to engage the vehicle V at substantially the same time, but arranged so that the brushing engagement of one unit precedes that of the other, whereby the brushes of the two separate units do not interfere one with the other. In practice, the brushes of the two units can occur or be positioned adjacent each other and much closer together than shown, the two units being shown as substantially separated in order to avoid confusion in illustrating the two separate units and their independent operation. For example, and in the preferred relationship, the brush of the secondary brushing unit S engages the vehicle V followed by engagement of the brush of the primary brushing unit P. Consequently, the brushing functions of the two separate units P and S can overlap, without interfering with each other.

The primary brushing unit P involves, generally, a mounting X, an inner arm Y pivotally carried by the mounting, and an outer arm Z pivotally carried by the first mentioned inner arm. In accordance with the invention, the inner arm Y normally extends transversely substantially the entire width of the vehicle V, while the outer arm Z normally extends at a right angle to and forwardly from the first mentioned arm (see FIG. 1). Also, the unit P is characterized by a brush means B carried at the active or live end of the outer arm Z.

The mounting X can vary widely, being located at the one side of the vehicle V, as above described. In practice, the mounting X is positioned substantially at the said side of the alley A in order to clear vehicles of maximum track width. For example, the mounting X can depend from a ceiling, or it can project from a wall, and/or preferably as shown it extends upwardly from the drive 10. In practice, a platform 20 is bolted onto the drive 10 and has a standard 21 that extends to a height well above the roof line of the vehicle V. The standard 21 has journal means 22 thereon for carrying the inner arm Y to swing in a horizontal plane, on a vertically disposed axis, forwardly from the above mentioned normal position to a diagonally extended forward position (for example see FIG. 5). Further, the mounting X includes stop means 23 to limit rearward movement of arm Y to that position shown in FIG. 4, and as a safety measure a stop means 24 to limit forward movement of arm Y to a position such as that shown in FIG. 5 for clearing the right side of a maximum width vehicle.

The inner arm Y is pivotally carried on the vertical axis by said journal means 22 and extends horizontally to the far side of the vehicle over which it swings. The inner arm Y is a rigid structure that articulates to and intermediate the two stop means 23 and 24, being biased to return to the stop means 23 as by return means 25. Although the return means 25 can vary widely, it is shown as a tension device comprised of a weight 26 operating by gravity a pull line 27 anchored to the back side of the arm Y and operating over pulleys 28 disposed to pull rearwardly of said arm. Further, the arm Y includes stop means 30 to limit outward movement of arm Z to that position shown in FIGS. 4 and 5, and a stop means 31 to limit inward movement of arm Z to that theoretically evtreme position shown in FIG. 7. Consequently, the arm Y is pulled toward the stop 23, the anchoring of line 27 to the back side of arm Y being made to a sheave or pulley 32 (as shown), said pulley being fixed to the arm Z so as to bias said arm outwardly to the position shown in FIGS. 4, 5 and 8. Thus, the arm Y is yieldingly urged to the normal transverse position, and the outer arm Z is simultaneously yieldingly urged to said outward position, a journal means 29 being provided thereon at the terminal end of arm Y for carrying the outer arm Z to swing in a horizontal plane, on a vertical axis and extended forwardly.

The outer arm Z is pivotally carried on a vertical axis by said journal means 29 and extends horizontally to a forwardmost point wherein it carries the brush means B. Like the inner arm Y, the outer arm Z also swings over the vehicle, being disposed in substantially the same plane of movement as the first mentioned arm. The arm Z is a rigid structure that articulates to and intermedate the two stop means 30 and 31, being biased to return to the stop means 30 as by the return means 25 hereinabove described.

The brush means B is of the usual construction, comprising a vertically disposed spindle 33 that is revolved by a drive 34. The brush 35 thereof is made up of a cylindrical core that has flexible bristles which flail outwardly by action of centrifugal force so as to impinge upon the vehicle body with a brushing action. Thus, the brush 35 is involved in a clockwise direction and is adapted to engage into and over the varied contours that are encountered throughout the vehicle body.

The secondary brushing unit S involves, generally, a mounting X', an arm Y' and brush means B'. The unit S is located at the one side of the vehicle V as above described, and it is adapted to brush the longitudinal extent of said one side of the vehicle. The mounting X' can vary the same as mounting X above described and it is preferably a platform 20' bolted onto the drive 10, and it has a standard 21' that extends upwardly. However, standard 21' is of limited height, in practice about half the height of the vehicle, and has journal means 22' thereon for carrying the arm Y' to swing in a horizontal plane, on a vertical axis, forwardly and away from the side of the vehicle. Stop means 23' and 24' limit rearward and forward movement of the arm Y, there being bias means in the form of a spring 25' to return the arm Y' toward the stop means 23'. The arm Y' is of substantially lesser extent as compared with arm Y, and the brush means B' is substantially the same as the brush B above described and revolved as shown. It is to be understood that both brush means B and B' can be extended to the full height of the vehicle, in the event that circumstances so require.

From the foregoing, the simple and straight-forward nature of the present invention will be understood and wherein a single primary brushing unit P and single secondary brushing unit S effectively brushes all four sides of the vehicle V. The primary unit P, by virtue of its inner arm Y reaching completely across the top of the vehicle, makes it possible to scrub the entire front as well as the entire back of the vehicle body. Sequentially, as the vehicle V is driven or advanced by the pusher-bar 14 the apparatus operates as follows: Firstly, the vehicle V is moved into engagement with the brush B' of the secondary unit S which commences scrubbing the left side of the vehicle, followed by initial engagement of the brush B of the primary unit P with the far left corner of the vehicle at the front thereof (see FIG. 4). Secondly, the vehicle V continues to advance and which results in traverse of the brush B to the far right corner of the vehicle at the front thereof (see FIG. 5), as a result of bodily displacement of both inner and outer arms Y and Z. Thirdly, the vehicle V continues to advance and which results in the escape of the brush B from the front to the right side of the vehicle and which results in scrubbing the said right side of the vehicle body and whereupon the rearward bias upon the arm Y causes the brush B to engage said right side of the vehicle body and at this point, for example the brush B' of the secondary brushing unit S moves immediately and behind the vehicle body to scrub the back thereof up to the pusher-bar 14 (see FIG. 6). Fourthly, the vehicle V continues to advance and which results in the escape of the brush B from the right side to the back of the vehicle and which permits the inner arm Y to reach the stop means 23 so as to cause the forward and outward bias upon outer arm Z to move the brush B into engagement with the back of the vehicle body (see FIG. 7). Fifthly and finally, the vehicle V continues to advance and which causes the continued traverse of the brush B to the left side of the vehicle V where the core of the brush B is restricted as by means of the stops 23 and 30 so as to avoid striking the pusher-bar or any like obstruction (see FIG. 8). The brushes B and B' revolve as shown in order to aid in the progressive movement thereof against the side of the vehicle body, and so as to wipe and/or scrub around and into the various corners of the vehicle.

It is to be understood that the pusher-bar is a limiting factor, and in those installations where it does not exist the primary brushing unit P is extended transversely, as above described so as to engage the brush B with the entire front and entire back of the vehicle body.

Having described only a typical preferred form and application of my invention, I do not wish to be limited or restricted to the specific details herein set forth, but wish to reserve to myself any modifications or variations that may appear to those skilled in the art.

Having described my invention, I claim:

1. In a car wash having an alley with wheel guides to direct the vehicle therethrough, a primary brushing unit for scrubbing the front, one side and back of the vehicle body and including, a mounting at the one side of the vehicle and having a vertically disposed journal, an inner arm carried by the journal and mounting therefor to swing to a normal position extended transversely over and to the other side of the vehicle and having a vertically disposed journal at its swinging end remote from the first mentioned journal, stop means faced in the direction of movement of the vehicle to limit rearward wovement of the inner arm to said normal position and means yieldingly urging said inner arm to engage said stop means, an outer arm carried by the second mentioned journal and inner arm to swing to a position extended forwardly over and in the direction of movement of the vehicle, stop means faced toward the mounting and carried by the inner arm to limit outward swinging of the outer arm and means yieldingly urging said outer arm to engage said stop means, and a vertically disposed brushing unit carried at the swinging end of the outer arm remote from the second mentioned journal and confined to operate within the alley by said two stop means, a secondary brushing unit for scrubbing the other side of the vehicle body and including, a mounting at said other side of the vehicle body and having a vertically disposed journal, an arm carried by the journal and mounting therefor to swing to a position extended forwardly in the direction of movement of the vehicle, stop means faced outwardly to limit inward swinging of the arm toward the vehicle and means yieldingly urging said arm to engage said stop means, and a vertically disposed brushing unit carried at the swinging end of the arm remote from the journal and confined to operate at the said other side by said stop means therefor and engageable with said other side of the vehicle body, and conveyor means to advance the vehicle through the alley.

2. The car wash as set forth in claim 1 wherein the conveyor means is engageable with the vehicle from the back thereof and immediately inboard of the said other side thereof, and at the ending points of the scrubbing engagement of the brushing units with the vehicle.

3. The car wash as set forth in claim 1 wherein the operational beginning point at the front of the vehicle and the operational ending point at the back of the vehicle, of the scrubbing engagement of the brushing units with the vehicle, are immediately inboard of the said other side of the vehicle.

4. The car wash as set forth in claim 1 and wherein the operational beginning point at the front of the vehicle and the operation ending point at the back of the vehicle, of the scrubbing engagement of the braking units with the vehicle, are immediately inboard of the said other side of the vehicle, and wherein the conveyor means is engageable with the vehicle from the back thereof and immediately inboard of said other side thereof and at the said operational ending point at the back of the vehicle.

References Cited

UNITED STATES PATENTS 3,332,098 7/1967 Smith.
3,350,733 11/1967 Hanna.

FOREIGN PATENTS 1,482,252 4/1967 France.
652,799 2/1963 Italy.

EDWARD L. ROBERTS, *Primary Examiner.*